United States Patent
Rangegowda et al.

(10) Patent No.: US 9,531,674 B2
(45) Date of Patent: Dec. 27, 2016

(54) VIRTUAL HOST SECURITY PROFILES

(75) Inventors: Dharshan Rangegowda, Seattle, WA (US); Jeffrey R. Goldian, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1502 days.

(21) Appl. No.: 12/616,163

(22) Filed: Nov. 11, 2009

(65) Prior Publication Data

US 2011/0113483 A1 May 12, 2011

(51) Int. Cl.
*G06F 9/00* (2006.01)
*G06F 15/16* (2006.01)
*G06F 17/00* (2006.01)
*H04L 29/06* (2006.01)

(52) U.S. Cl.
CPC ......... *H04L 63/0263* (2013.01); *H04L 63/102* (2013.01); *G06F 2221/2141* (2013.01); *G06F 2221/2149* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,009,475 A | 12/1999 | Shrader | |
| 6,052,788 A | 4/2000 | Wesinger, Jr. et al. | |
| 6,098,172 A | 8/2000 | Coss et al. | |
| 6,182,226 B1 | 1/2001 | Reid et al. | |
| 7,143,438 B1 | 11/2006 | Coss et al. | |
| 7,890,637 B1* | 2/2011 | Zhang et al. | 709/227 |
| 8,166,474 B1* | 4/2012 | Delco et al. | 718/1 |
| 2004/0128545 A1* | 7/2004 | Chakravarty | 713/201 |
| 2004/0225895 A1 | 11/2004 | Mukherjee et al. | |
| 2005/0198306 A1* | 9/2005 | Palojarvi et al. | 709/227 |
| 2005/0260973 A1 | 11/2005 | Van De Groenendaal | |
| 2006/0193295 A1* | 8/2006 | White et al. | 370/336 |
| 2006/0274750 A1* | 12/2006 | Babbar et al. | 370/390 |
| 2008/0008141 A1* | 1/2008 | Tchigevsky et al. | 370/338 |
| 2008/0031185 A1 | 2/2008 | Bims | |
| 2008/0163357 A1 | 7/2008 | Xiao | |
| 2008/0189628 A1* | 8/2008 | Liesche et al. | 715/762 |

FOREIGN PATENT DOCUMENTS

| | | |
|---|---|---|
| CN | 101228806 A | 7/2008 |
| JP | 2006109048 A | 4/2006 |
| JP | 2006270273 A | 10/2006 |

(Continued)

OTHER PUBLICATIONS

"International Search Report", Mailed Date: Jun. 21, 2011, Application No. PCT/US2010/054562, Filed Date: Oct. 28, 2010, pp. 9.

(Continued)

*Primary Examiner* — Nadia Khoshnoodi
(74) *Attorney, Agent, or Firm* — Ben Tabor; Kate Drakos; Micky Minhas (57) ABSTRACT

Architecture that creates and applies a virtual firewall profile for each network to which a multi-homed device is connected. In one implementation, the virtual profiles can be based on address ranges of the networks. This ensures seamless concurrent connectivity of the multi-homed device to multiple networks.

19 Claims, 7 Drawing Sheets

(56) References Cited

FOREIGN PATENT DOCUMENTS

JP    2008546321 A    12/2008
WO    2007072245 A2   6/2007

OTHER PUBLICATIONS

Bukhatwa, et al., "Effects of Ordered Access Lists in Firewalls", retrieved at <<http://www.angelfire.com/bc3/faheem/index_files/EFFECTS-OF-ORDERED-ACCESS-LISTS-IN-FIREWALLS.pdf>>, Nov. 2003; pp. 257-264.
Zalenski, Robert, "Firewall Technologies", retrieved at <<http://140.130.175.70/pdf/00985324.pdf>>, Feb./Mar. 2002; pp. 24-29; IEEE Potentials.
First Office Action and Search Report Issued in Chinese Patent Application No. 201080050983.X, Mailed Date: Jun. 4, 2014, 12 Pages.
Second Office Action Issued in Chinese Patent Application No. 201080050983.X, Mail Date: Feb. 27, 2015, 8 Pages.
Office Action Issued in Japanese Patent Application No. 2012-538843, Mail Date: Oct. 28, 2014, 5 Pages.

* cited by examiner

VIRTUAL HOST SECURITY PROFILES

BACKGROUND

Host firewalls typically configure different firewall profiles depending on the network to which the host is connected. Currently, three standard types of profiles can be offered—work, home, and public. In other words, if a user connects to a work network, the host firewall is in the work profile; if the user is at home, the host firewall is in the home profile. The public firewall tends to be very restrictive and the work/home firewalls tend to be less restrictive.

In multi-homed machines (connected to multiple networks at the same time), the host firewall needs to determine a firewall profile for the machine. In such instances, the host firewall selects the most restrictive of the firewall profiles. For example, if the machine is connected to both a corporate network (corpnet) and to a public network at local business, the public profile is applied, since the public profile is typically the more restrictive of the profiles. However, this is a hindrance for seamless connectivity, since machines on the corpnet cannot contact this machine due to the restrictive profile selected for the firewall.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables the creation and application of virtual security profiles, such as firewall profiles, for each network to which a machine (device) is connected. Each security profile includes a set of rules that constrains device connectivity according to that profile. In one implementation, the virtual security profile can be based on an address range of a single network or over several networks. For example, if multi-homed Machine M is connected to a Network A (having address ranges A1-A10) and a Network B (having address ranges B1-B10), then two sets of security rules (e.g., firewall) can be created. One set of rules is constrained to apply to address ranges (A1-A10), for all traffic from Network A, and another set of rules is constrained to apply to address ranges (B1-B10), for all traffic from Network B. This ensures seamless concurrent connectivity of the multi-homed Machine M to both Network A and Network B.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture provides for the use of different security profiles for correspondingly different communications connections in a multi-homed device. In the context of firewalls, multiple virtual host firewall profiles enable the host firewall to create multiple firewall profiles, based on the address ranges of each network, for example, to which the device is connected. This enables seamless connectivity with all the networks to which a multi-homed device is connected. More specifically, if a device is connected to two networks, two sets of firewall rules are created and imposed—(e.g., one set of rules is applied for the address ranges of Network A and another set of rules is applied for the address ranges of Network B).

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
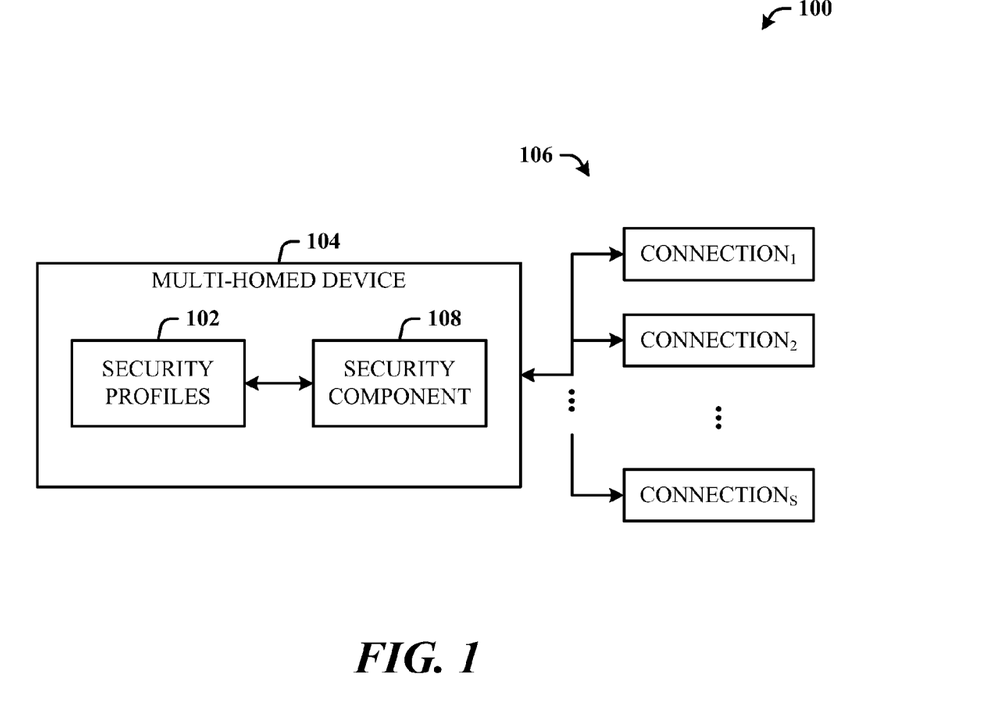
FIG. 1 illustrates a computer-implemented security system in accordance with the disclosed architecture.

FIG. 1 illustrates a computer-implemented security system 100 in accordance with the disclosed architecture. The system 100 includes a set of virtual security profiles 102 that provides communications security for a multi-homed device 104. The set of security profiles 102 is associated with connections 106 from which data packets can be received. The security profiles 102 can also be associated with multiple physical connections, meaning that the relationship can be 1-to-many, as well as 1-to-1. The system 100 can also include a security component 108 for automatically selecting and applying security profiles of the set of security profiles 102 in response to receiving data packets from multiple connections of the connections 106. The security component 108 can also be driven by administrator policy (ies).

The set of security profiles 102 can include firewall profiles that configure secure access to the multi-homed device 104. The set of security profiles 102 can include a security profile associated with a virtual network. That is, the security profile configures security settings for interacting with the virtual network. Additionally, or alternatively, the set of security profiles 102 can include a security profile associated with a physical network. That is, the security profile configures security settings for interacting with the physical network.

The set of security profiles 102 can include security profiles that constrain communications to different addresses (e.g., network) associated with correspondingly different connections. In other words, a first security profile includes the settings for configuring secure communications over a first connection defined by a first address or ranges of addresses, and second security profile includes the settings for configuring secure communications over a second connection defined by a second address or ranges of addresses. Note that the connections 106 can be network connections and/or, internal application and process connections.

Figure 2:
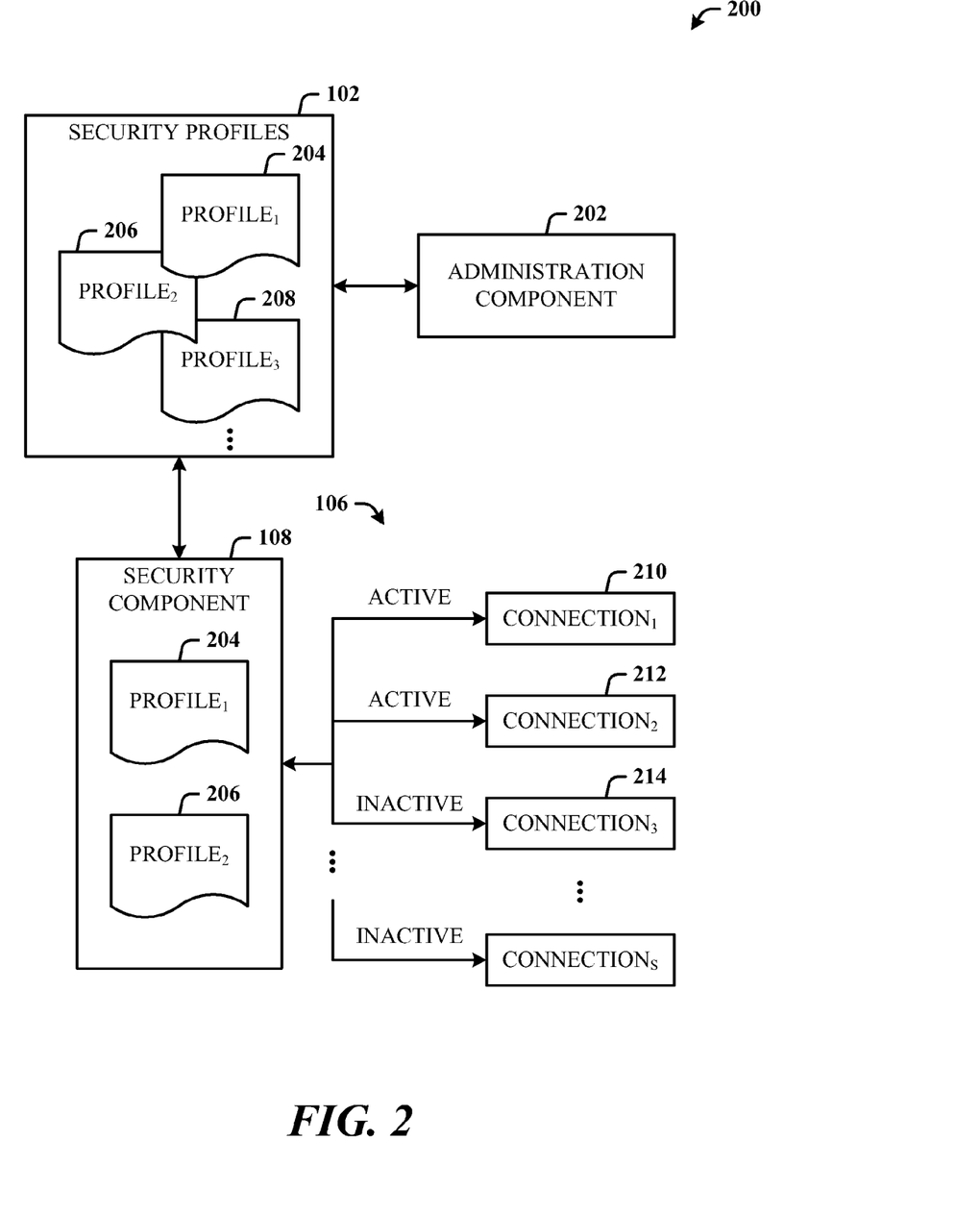
FIG. 2 illustrates an alternative embodiment of a security system that further includes an administration component.

FIG. 2 illustrates an alternative embodiment of a security system 200 that further includes an administration component 202. The administration component 202 enables the creation of the security profiles 102. The administration component 202 can also handle storage of the security profiles 102. For example, storage can be to a network storage and thereafter for selection, retrieval and download to the multi-homed device as desired. Alternatively, or in combination therewith, the appropriate profiles can be downloaded to the multi-homed device for storage, and then caching during use with active connections (e.g., internal process connections and/or external connections).

In this exemplary illustration, the set of security profiles 102 include: a first profile 204, a second profile 206, and a third profile 208, each corresponding to three of the connections 106: a first active connection 210, a second active connection 212, and a third inactive connection 214. Once the system 200 (e.g., the security component 108) determines that a connection is active, the corresponding security profile is also activated by the security component 108. This determination of a connection being active or inactive can be made by examining packets communicated over a connection. Thus, the first profile 204 and the second profile 206 are activated and provide secure communications. In other words, the first security profile 204 provides secure communications to the first connection 210 and the second security profile provides secure communications to the second connection 212.

Additionally, the security provided by the first and second security profiles (204 and 206) is disjointed, in that, the first security profile 204 does not affect the security of the second connection 212, and the second security profile 206 does not affect the security of the first connection 210.

Figure 3:
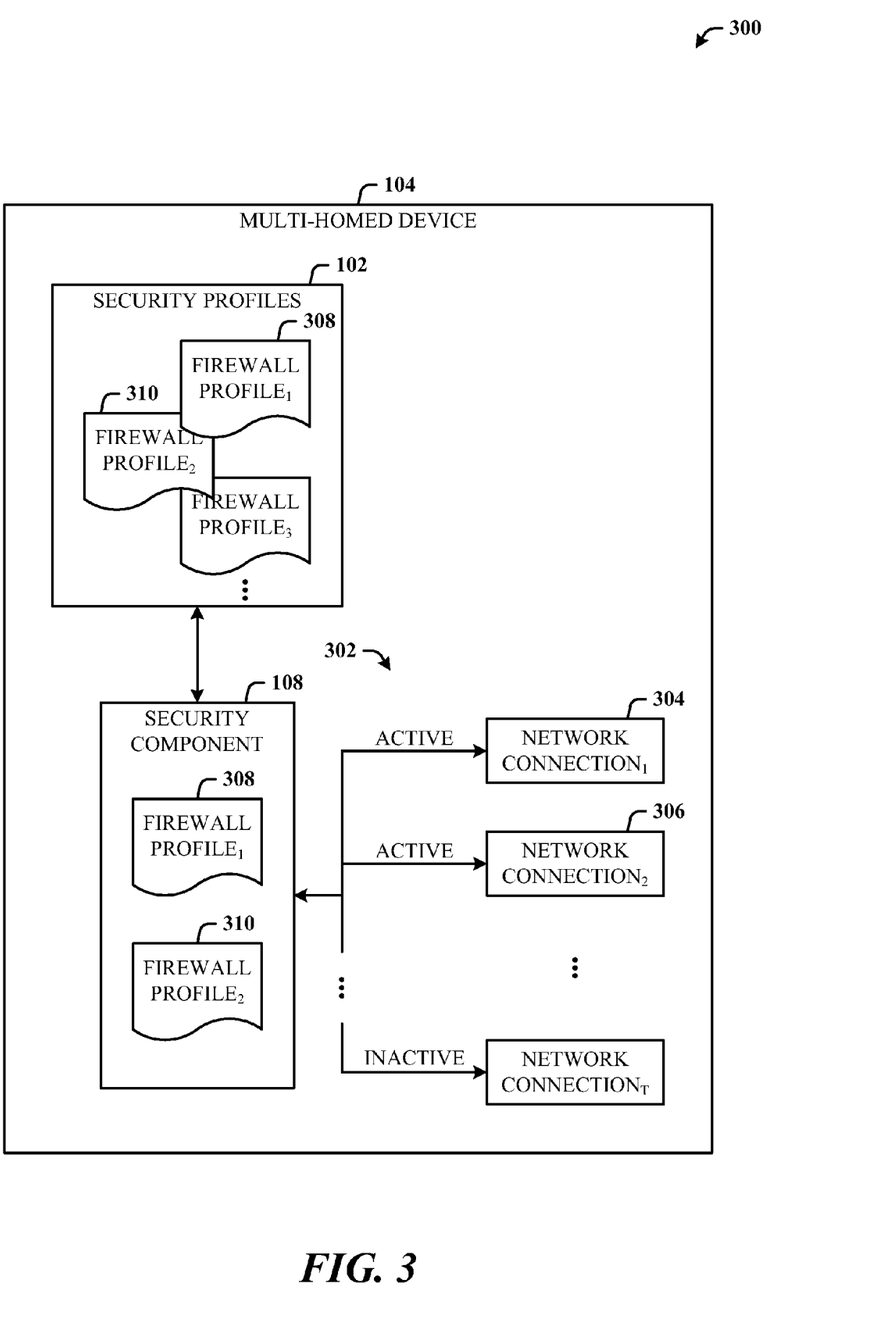
FIG. 3 illustrates an alternative embodiment of a security system that applies firewall profiles based on network addressing.

FIG. 3 illustrates an alternative embodiment of a security system 300 that applies firewall profiles based on network addressing. In one implementation, the virtual security profiles 102 can be based on a network address or range of network addresses of a single network or over several networks. Here, the security component 108 of the multi-homed device 104 senses that two of the network connections 302 are active: a first network connection 304 and a second network connection 306. The security component 108 can examine packets to determine which network connections 302 are active, and to determine which firewall profiles (of the security profiles 102) to select and apply.

For example, if the multi-homed device 104 is actively connected to the first network connection 304 (having address ranges A1-A10) and the second network connection 306 (having address ranges B1-B10), then two sets of firewall security rules can be created and applied. One set of firewall rules, a first firewall profile 308, is constrained to apply to address ranges (A1-A10) for all traffic from the first network connection 304, and a second set of firewall rules, a second firewall profile 310, is constrained to apply to address ranges (B1-B10) for all traffic from the second network connection 306. This ensures seamless concurrent connectivity of the multi-homed device 104 to both the first and second network connections (304 and 306).

It is also within contemplation of the instant architecture that the same firewall rule can be applied to multiple profiles—each firewall rule can take a set of profiles to which it is applicable. Thus, there are firewall rules, firewall profiles, and connections. Each firewall rule can belong to one or more profiles. Each profile can be applied to one or more connections.

Put another way, the computer-implemented security system 300 comprises a set of firewall profiles for providing communications security for the multi-homed 104 device. The firewall profiles are associated with connections 302 from which data packets can be received. The system 300 also includes the security component 108 that automatically selects and applies specific firewall profiles to active connections of the connections 302.

The set of firewall profiles configures firewall access to the multi-homed device 104. The set of firewall profiles includes a firewall profile associated with a virtual network, a physical network and/or both virtual and physical networks. The set of firewall profiles includes firewall profiles that constrain communications to different network addresses associated with correspondingly different network connections. The system 300 can further comprise the administration component 202 (not shown) for creating the firewall profiles and downloading the firewall profiles to the security component 108 of the multi-homed device 104.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
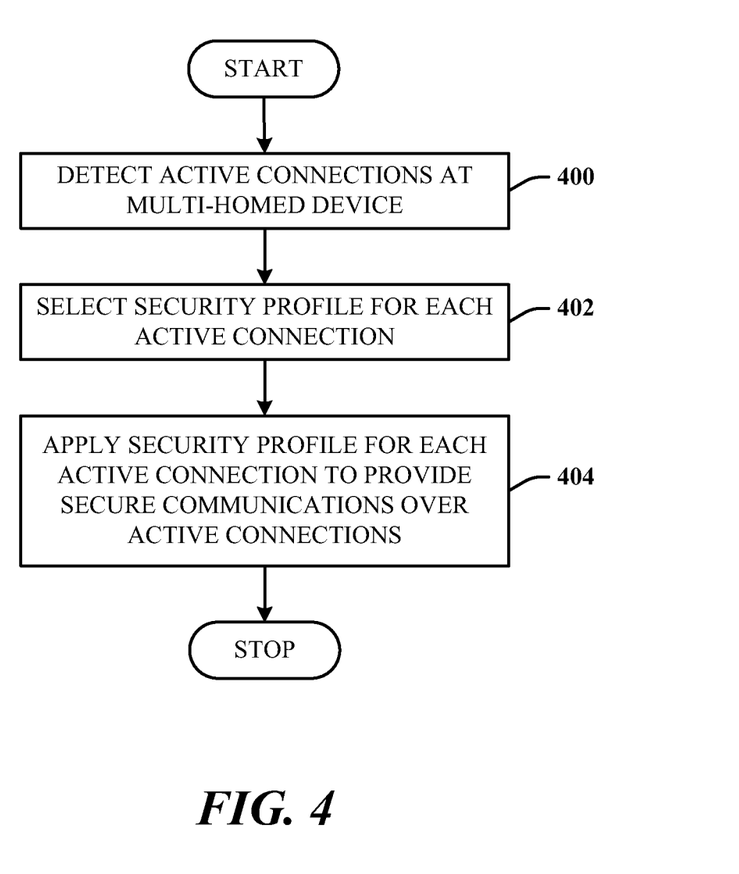
FIG. 4 illustrates a computer-implemented security method for a multi-homed device.

FIG. 4 illustrates a computer-implemented security method for a multi-homed device. At 400, active connections are detected at the multi-homed device. At 402, a security profile is selected for each active connection. At 404, the security profile for each active connection is applied to provide secure communications over the active connections.

Figure 5:
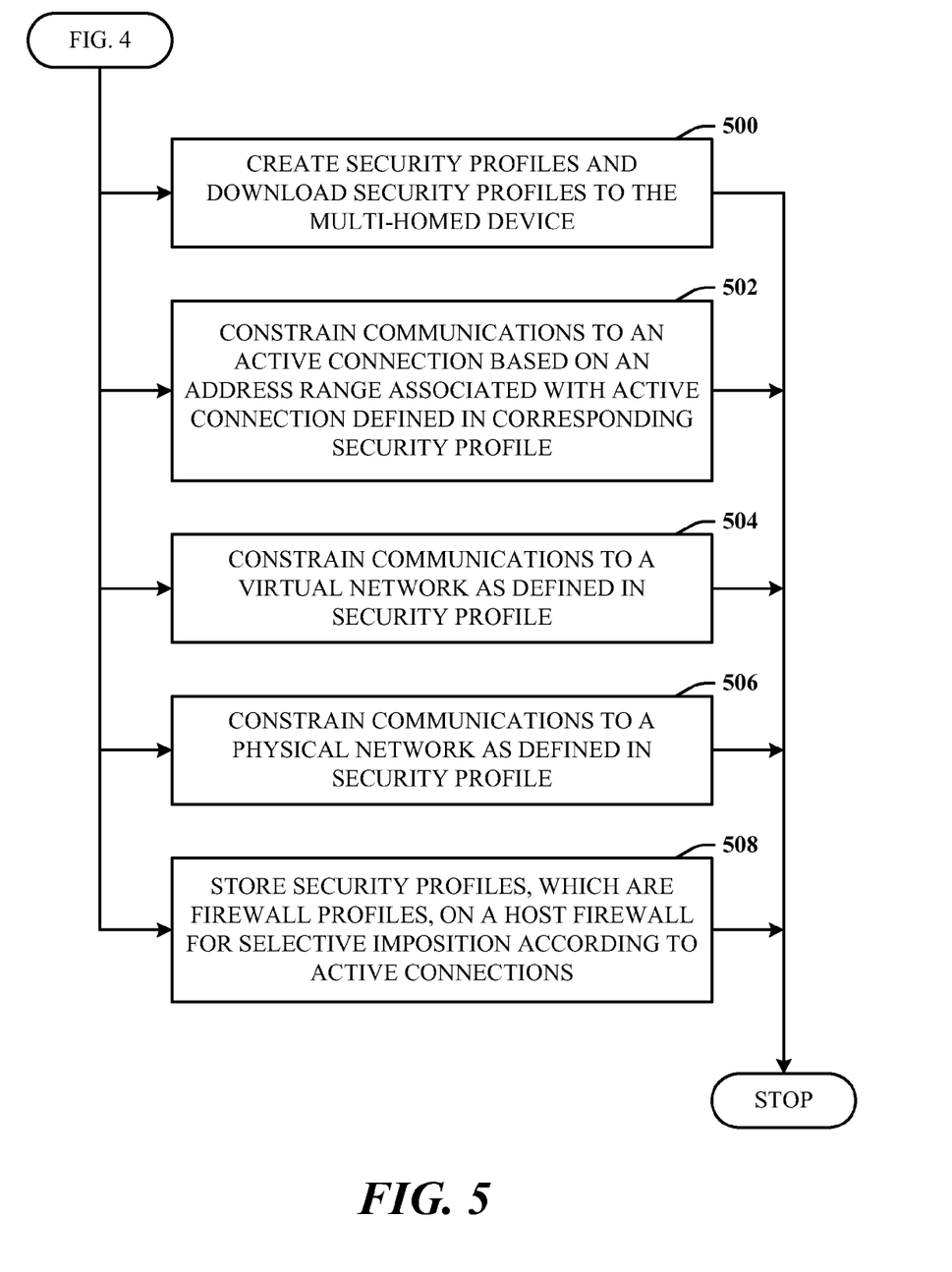
FIG. 5 illustrates additional aspects of the method of FIG. 4.

FIG. 5 illustrates additional aspects of the method of FIG. 4. At 500, the security profiles are created and downloaded to the multi-homed device. At 502, communications to an active connection is constrained based on an address range associated with the active connection as defined in the corresponding security profile. At 504, communications is constrained to a virtual network as defined in the security profile. At 506, communications is constrained to a physical network as defined in the security profile. At 508, the security profiles, which are firewall profiles, are stored on a host firewall for selective imposition according to active connections.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 6:
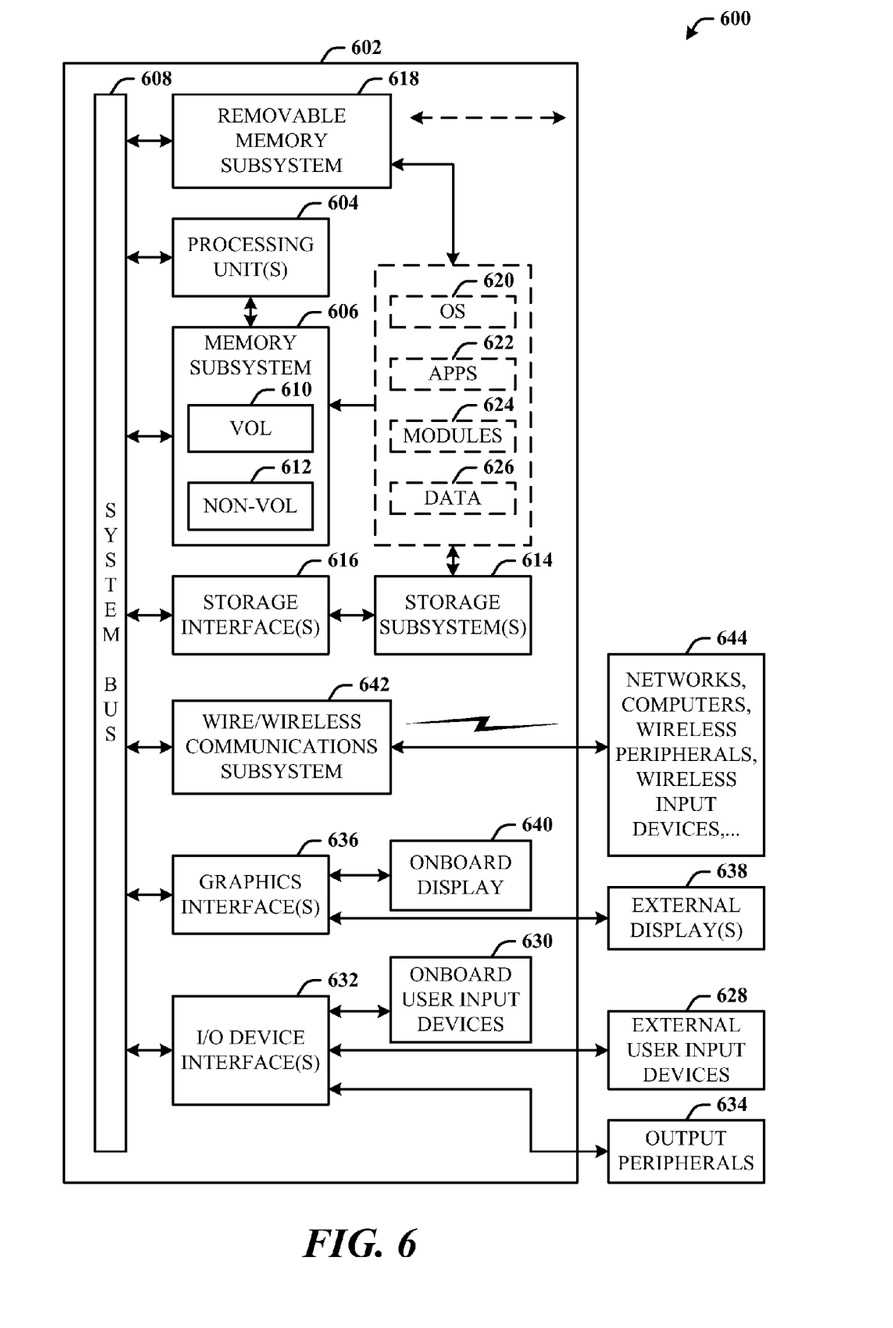
FIG. 6 illustrates a block diagram of a computing system operable to execute security profile management and utilization for multi-homing in accordance with the disclosed architecture.

Referring now to FIG. 6, there is illustrated a block diagram of a computing system 600 operable to execute security profile management and utilization for multi-homing in accordance with the disclosed architecture. In order to provide additional context for various aspects thereof, FIG. 6 and the following description are intended to provide a brief, general description of the suitable computing system 600 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 600 for implementing various aspects includes the computer 602 having processing unit(s) 604, a computer-readable storage such as a system memory 606, and a system bus 608. The processing unit(s) 604 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 606 can include computer-readable storage such as a volatile (VOL) memory 610 (e.g., random access memory (RAM)) and non-volatile memory (NON-VOL) 612 (e.g., ROM, EPROM, EEPROM, etc.). A basic input/output system (BIOS) can be stored in the non-volatile memory 612, and includes the basic routines that facilitate the communication of data and signals between components within the computer 602, such as during startup. The volatile memory 610 can also include a high-speed RAM such as static RAM for caching data.

The system bus 608 provides an interface for system components including, but not limited to, the memory subsystem 606 to the processing unit(s) 604. The system bus 608 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 602 further includes machine readable storage subsystem(s) 614 and storage interface(s) 616 for interfacing the storage subsystem(s) 614 to the system bus 608 and other desired computer components. The storage subsystem(s) 614 can include one or more of a hard disk drive (HDD), a magnetic floppy disk drive (FDD), and/or optical disk storage drive (e.g., a CD-ROM drive DVD drive), for example. The storage interface(s) 616 can include interface technologies such as EIDE, ATA, SATA, and IEEE 1394, for example.

One or more programs and data can be stored in the memory subsystem 606, a machine readable and removable memory subsystem 618 (e.g., flash drive form factor technology), and/or the storage subsystem(s) 614 (e.g., optical, magnetic, solid state), including an operating system 620, one or more application programs 622, other program modules 624, and program data 626.

The one or more application programs 622, other program modules 624, and program data 626 can include the entities and components of the system 100 of FIG. 1, the entities and components of the system 200 of FIG. 2, entities and components of the system 300 of FIG. 3, and the FIGS. 4-5, for example.

Generally, programs include routines, methods, data structures, other software components, etc., that perform particular tasks or implement particular abstract data types. All or portions of the operating system 620, applications 622, modules 624, and/or data 626 can also be cached in memory such as the volatile memory 610, for example. It is to be appreciated that the disclosed architecture can be implemented with various commercially available operating systems or combinations of operating systems (e.g., as virtual machines).

The storage subsystem(s) 614 and memory subsystems (606 and 618) serve as computer readable media for volatile and non-volatile storage of data, data structures, computer-executable instructions, and so forth. Computer readable media can be any available media that can be accessed by the computer 602 and includes volatile and non-volatile internal and/or external media that is removable or non-removable. For the computer 602, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 602, programs, and data using external user input devices 628 such as a keyboard and a mouse. Other external user input devices 628 can include a microphone, an IR (infrared) remote control, a joystick, a game pad, camera recognition systems, a stylus pen, touch screen, gesture systems (e.g., eye movement, head movement, etc.), and/or the like. The user can interact with the computer 602, programs, and data using onboard user input devices 630 such a touchpad, microphone, keyboard, etc., where the computer 602 is a portable computer, for example. These and other input devices are connected to the processing unit(s) 604 through input/output (I/O) device interface(s) 632 via the system bus 608, but can be connected by other interfaces such as a parallel port, IEEE 1394 serial port, a game port, a USB port, an IR interface, etc. The I/O device interface(s) 632 also facilitate the use of output peripherals 634 such as printers, audio devices, camera devices, and so on, such as a sound card and/or onboard audio processing capability.

One or more graphics interface(s) 636 (also commonly referred to as a graphics processing unit (GPU)) provide graphics and video signals between the computer 602 and external display(s) 638 (e.g., LCD, plasma) and/or onboard displays 640 (e.g., for portable computer). The graphics interface(s) 636 can also be manufactured as part of the computer system board.

The computer 602 can operate in a networked environment (e.g., IP-based) using logical connections via a wired/wireless communications subsystem 642 to one or more networks and/or other computers. The other computers can include workstations, servers, routers, personal computers, microprocessor-based entertainment appliances, peer devices or other common network nodes, and typically include many or all of the elements described relative to the computer 602. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 602 connects to the network via a wired/wireless communication subsystem 642 (e.g., a network interface adapter, onboard transceiver subsystem, etc.) to communicate with wired/wireless networks, wired/wireless printers, wired/wireless input devices 644, and so on. The computer 602 can include a modem or other means for establishing communications over the network. In a networked environment, programs and data relative to the computer 602 can be stored in the remote memory/storage device, as is associated with a distributed system. It will be appreciated that the network connections shown are exemplary and other means of establishing a communications link between the computers can be used.

The computer 602 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 7:
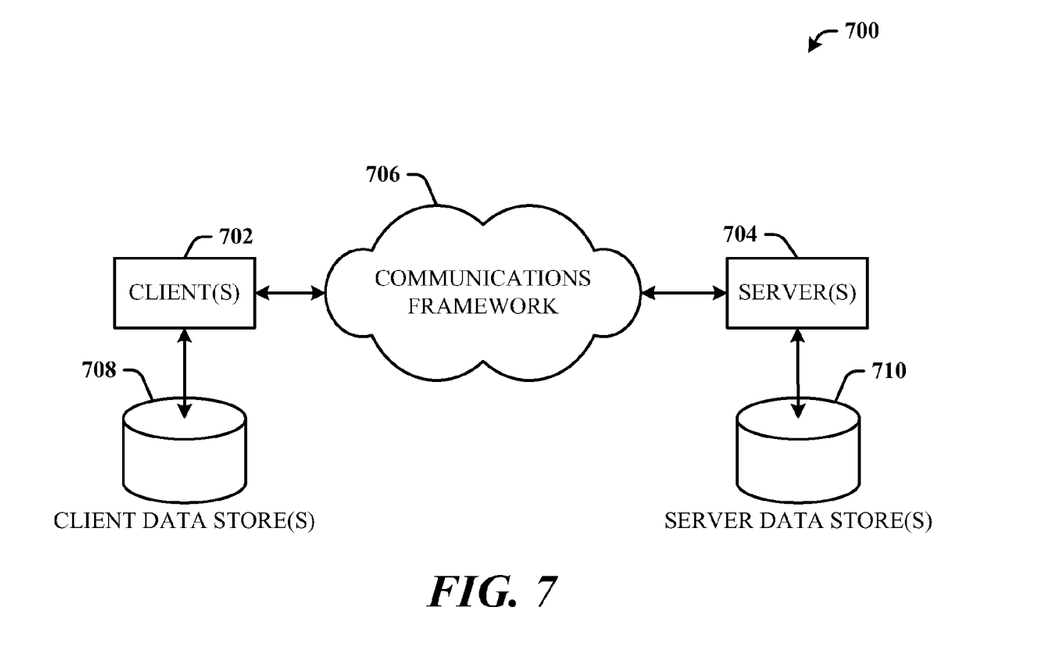
FIG. 7 illustrates a schematic block diagram of a computing environment that executes security profile management and utilization for a multi-homed device.

Referring now to FIG. 7, there is illustrated a schematic block diagram of a computing environment 700 that executes security profile management and utilization for a multi-homed device. The environment 700 includes one or more client(s) 702. The client(s) 702 can be hardware and/or software (e.g., threads, processes, computing devices). The client(s) 702 can house cookie(s) and/or associated contextual information, for example.

The environment 700 also includes one or more server(s) 704. The server(s) 704 can also be hardware and/or software (e.g., threads, processes, computing devices). The servers 704 can house threads to perform transformations by employing the architecture, for example. One possible communication between a client 702 and a server 704 can be in the form of a data packet adapted to be transmitted between two or more computer processes. The data packet may include a cookie and/or associated contextual information, for example. The environment 700 includes a communication framework 706 (e.g., a global communication network such as the Internet) that can be employed to facilitate communications between the client(s) 702 and the server(s) 704.

Communications can be facilitated via a wire (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 704 are operatively connected to one or more server data store(s) 710 that can be employed to store information local to the servers 704.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented security system, comprising:
   a set of security profiles that provides communications security for a multi-homed device, each of the security profiles including a set of rules that constrains device connectivity according to that profile, the security profiles being associated with connections from which data packets are being received, the set of security profiles comprising a first security profile being constrained to apply to a first address range for all traffic from a first active connection, and a second security profile being constrained to apply to a second address range for all traffic from a second concurrently active connection, the first security profile being different from the second security profile such that the first security profile does not affect security of the second concurrently active connection and the second security profile does not affect security of the first active connection; and
   a security component for determining if the connections are active by examining the data packets received, and responsive to determining that one or more of the connections is active automatically selecting and applying corresponding security profiles to the one or more active connections.

2. The system of claim 1, wherein the connections are network connections.

3. The system of claim 1, wherein the set of security profiles includes firewall profiles that configure secure access to the multi-homed device.

4. The system of claim 1, wherein the set of security profiles includes a security profile associated with a virtual network.

5. The system of claim 1, wherein the set of security profiles includes a security profile associated with a physical network.

6. The system of claim 1, further comprising an administration component for creating the security profiles and downloading the security profiles to the security component of the multi-homed device.

7. The system of claim 3, wherein each firewall profile comprises one or more firewall rules, and each firewall profile is applicable to one or more connections.

8. A computer-implemented security system, comprising:
a set of firewall profiles that provides communications security for a multi-homed device, the set of firewall profiles configuring firewall access to the multi-homed device, and being associated with connections from which data packets are being received, the set of firewall profiles comprising a first firewall profile being constrained to apply to a first address range for all traffic from a first active connection, and a second firewall profile being constrained to apply to a second address range for all traffic from a second concurrently active connection to provide seamless concurrent connectivity of the multi-homed device to the first and second active connections, the first firewall profile being different from the second firewall profile; and
a security component for determining if the connections are active by examining the data packets received, and responsive to determining that one or more of the connections is active automatically selecting and applying specific firewall profiles to the one or more active connections.

9. The system of claim 8, wherein the set of firewall profiles includes a firewall profile associated with a virtual network.

10. The system of claim 8, wherein the set of firewall profiles includes a firewall profile associated with a physical network.

11. The system of claim 8, further comprising an administration component for creating the firewall profiles and downloading the firewall profiles to the security component of the multi-homed device.

12. The system of claim 8, wherein the connections are network connections.

13. The system of claim 8, wherein each firewall profile comprises one or more firewall rules, and each firewall profile is applicable to one or more connections.

14. A computer-implemented security method for a multi-homed device, comprising:
detecting concurrently active connections at the multi-homed device by examining data packets received from multiple connections;
selecting a security profile from a set of security profiles for each active connection, the security profiles being different from one another such that one security profile does not affect security of an active connection associated with another security profile;
applying the security profile for each active connection to provide secure communications over the active connections; and
constraining communications to the active connections based on address ranges associated with the active connections as defined in the security profile corresponding to each of the active connections.

15. The method of claim 14, further comprising creating the security profiles and downloading the security profiles to the multi-homed device.

16. The method of claim 14, further comprising constraining communications to a virtual network as defined in the security profile.

17. The method of claim 14, further comprising constraining communications to a physical network as defined in the security profile.

18. The method of claim 14, further comprising storing the security profiles, which are firewall profiles, on a host firewall for selective imposition according to active connections.

19. The method of claim 18, wherein each firewall profile comprises one or more firewall rules, and each firewall profile is applicable to one or more connections.

* * * * *